(12) United States Patent
Wang et al.

(10) Patent No.: US 11,068,176 B2
(45) Date of Patent: Jul. 20, 2021

(54) METHOD, APPARATUS AND COMPUTER PROGRAM PRODUCT FOR MANAGING STORAGE SYSTEM

(71) Applicant: EMC IP Holding Company LLC, Hopkinton, MA (US)

(72) Inventors: Sheng Wang, Beijing (CN); Jian Gao, Beijing (CN); Shuai Ni, Beijing (CN); Geng Han, Beijing (CN); Xinlei Xu, Beijing (CN); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 7 days.

(21) Appl. No.: 16/504,624

(22) Filed: Jul. 8, 2019

(65) Prior Publication Data
US 2020/0026445 A1 Jan. 23, 2020

(30) Foreign Application Priority Data
Jul. 20, 2018 (CN) .......................... 201810804196.8

(51) Int. Cl.
*G06F 3/06* (2006.01)
(52) U.S. Cl.
CPC .......... *G06F 3/0631* (2013.01); *G06F 3/0607* (2013.01); *G06F 3/0689* (2013.01)
(58) Field of Classification Search
CPC ..... G06F 3/0607; G06F 3/0631; G06F 3/0689
See application file for complete search history.

(56) References Cited

U.S. PATENT DOCUMENTS

| 8,132,073 | B1 | | 3/2012 | Bowers et al. | |
|---|---|---|---|---|---|
| 9,489,150 | B2 | * | 11/2016 | Aszmann | G06F 11/1435 |
| 10,430,279 | B1 | * | 10/2019 | Dittia | G06F 3/0688 |
| 10,642,520 | B1 | | 5/2020 | Zhao et al. | |
| 10,747,617 | B2 | | 8/2020 | Gao et al. | |
| 10,782,894 | B1 | | 9/2020 | Han et al. | |
| 10,852,966 | B1 | | 12/2020 | Liu et al. | |
| 2007/0118689 | A1 | * | 5/2007 | Hyde, II | G06F 3/0607 |
| | | | | | 711/114 |
| 2011/0296103 | A1 | * | 12/2011 | Igashira | G06F 3/0607 |
| | | | | | 711/114 |
| 2013/0254480 | A1 | * | 9/2013 | Chang | G06F 11/1084 |
| | | | | | 711/114 |
| 2014/0244927 | A1 | * | 8/2014 | Goldberg | G06F 3/0646 |
| | | | | | 711/114 |
| 2017/0277631 | A1 | * | 9/2017 | Tsuruya | G11C 29/76 |

* cited by examiner

*Primary Examiner* — Eric T Oberly
(74) *Attorney, Agent, or Firm* — BainwoodHuang (57) ABSTRACT

Techniques manage a storage system. Such techniques involve, in response to receiving a request to add a first number of disks to a storage resource pool in the storage system, determining whether the first number of disks are to be added to the storage resource pool in a plurality of phases. Such techniques further involve determining a second number of disks to be added to the storage resource pool in the first phase. Such techniques further involve determining first information on a first disk array group to be created with the second number of disks in the first phase. Such techniques further involve adding the second number of disks to the storage resource pool in the first phase by creating the first disk array group based on the first information. Such techniques enable a user to obtain an available capacity of the extended storage resource pool quickly and efficiently.

20 Claims, 10 Drawing Sheets

METHOD, APPARATUS AND COMPUTER PROGRAM PRODUCT FOR MANAGING STORAGE SYSTEM

CROSS-REFERENCE TO RELATED APPLICATION

This application claims priority to Chinese Patent Application No. CN201810804196.8, on file at the China National Intellectual Property Administration (CNIPA), having a filing date of Jul. 20, 2018, and having "METHOD, DEVICE AND COMPUTER PROGRAM PRODUCT FOR MANAGING STORAGE SYSTEM" as a title, the contents and teachings of which are herein incorporated by reference in their entirety.

FIELD

Embodiments of the present disclosure generally relate to the field of data storage, and specifically to a method, an apparatus and a computer program product for managing a storage system.

BACKGROUND

In a storage system, there usually exists a storage resource pool composed of a lot of disks. The disks may be divided into a set of continuous, non-overlapping and fixed sized disk extents (hereinafter referred to as DE). A redundant array of independent disks (RAID) group can be built based on the plurality of extents, and a storage logic unit can be created on the RAID group for use by a user. The RAID built based on the disk extents rather than the whole disk is also called a "mapped RAID". To ensure the access performance of the mapped RAID, a plurality of extents in each RAID stripe of the mapped RAID are expected to be evenly distributed in respective disks.

When the user requests to extend a capacity of the storage resource pool by adding a new disk, the newly-added disk may be divided into a plurality of extents, and these extents may be used to create a new RAID group. To ensure the access performance of the extended mapped RAID, it is usually necessary to perform a shuffling process to migrate data in some extents of the current disk to the extents of the newly-added disk, so as to ensure that the plurality of extents in the RAID strip of the extended mapped RAID are evenly distributed in the respective disks. That is to say, before obtaining the newly-created RAID group, the user needs to wait for completion of the shuffling process. Hence, if the amount of data to be migrated is relatively large, the user usually needs to wait a long period of time to obtain an available capacity of the extended storage resource pool.

SUMMARY

In general, embodiments of the present disclosure provide a method, an apparatus and a computer program product for managing a storage system.

According to a first aspect of the present disclosure, there is provided a method for managing a storage system. The method includes in response to receiving a request to add a first number of disks to a storage resource pool in the storage system, determining whether the first number of disks are to be added to the storage resource pool in a plurality of phases, wherein the storage resource pool includes at least one disk having a plurality of extents, and at least a part of the plurality of extents is included in at least one disk array group. The method further includes in response to determining that the first number of disks are to be added to the storage resource pool in the plurality of phases including a first phase, determining a second number of disks to be added to the storage resource pool in the first phase. The method further includes determining first information on a first disk array group to be created with the second number of disks in the first phase. In addition, the method further includes adding the second number of disks to the storage resource pool in the first phase by creating the first disk array group in the storage resource pool based on the first information.

According to a second aspect of the present disclosure, there is provided an apparatus for managing a storage system. The apparatus includes at least one processing unit and at least one memory. The at least one memory is coupled to the at least one processing unit and stores instructions for execution by the at least one processing unit. The instructions, when executed by the at least one processing unit, cause the apparatus to perform acts including: in response to receiving a request to add a first number of disks to a storage resource pool in the storage system, determining whether the first number of disks are to be added to the storage resource pool in a plurality of phases, wherein the storage resource pool includes at least one disk having a plurality of extents, and at least a part of the plurality of extents is included in at least one disk array group; in response to determining that the first number of disks are to be added to the storage resource pool in the plurality of phases including a first phase, determining a second number of disks to be added to the storage resource pool in the first phase; determining first information on a first disk array group to be created with the second number of disks in the first phase; and adding the second number of disks to the storage resource pool in the first phase by creating the first disk array group in the storage resource pool based on the first information.

According to a third aspect of the present disclosure, there is provided a computer program product that is tangibly stored on a non-transient computer readable medium and includes machine-executable instructions. The machine-executable instructions, when being executed by an apparatus, cause the apparatus to execute any step of the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

Throughout the figures, the same or corresponding reference numbers denote the same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

As stated above, in the storage system, there usually exists a storage resource pool composed of a lot of disks. The disks may be divided into a set of continuous, non-overlapping and fixed sized disk extents. A redundant array of independent disks (RAID) group can be built based on the plurality of extents, and a storage logic unit can be created on the RAID group for use by a user. The RAID group may include a plurality of RAID strips. Taking a RAID5 in a 4D+1P layout as an example, one RAID strip may include four data extents and one parity extent. To ensure the access performance of the mapped RAID, the plurality of extents in each RAID stripe of the mapped RAID are expected to be evenly distributed in respective disks.

Figure 1:
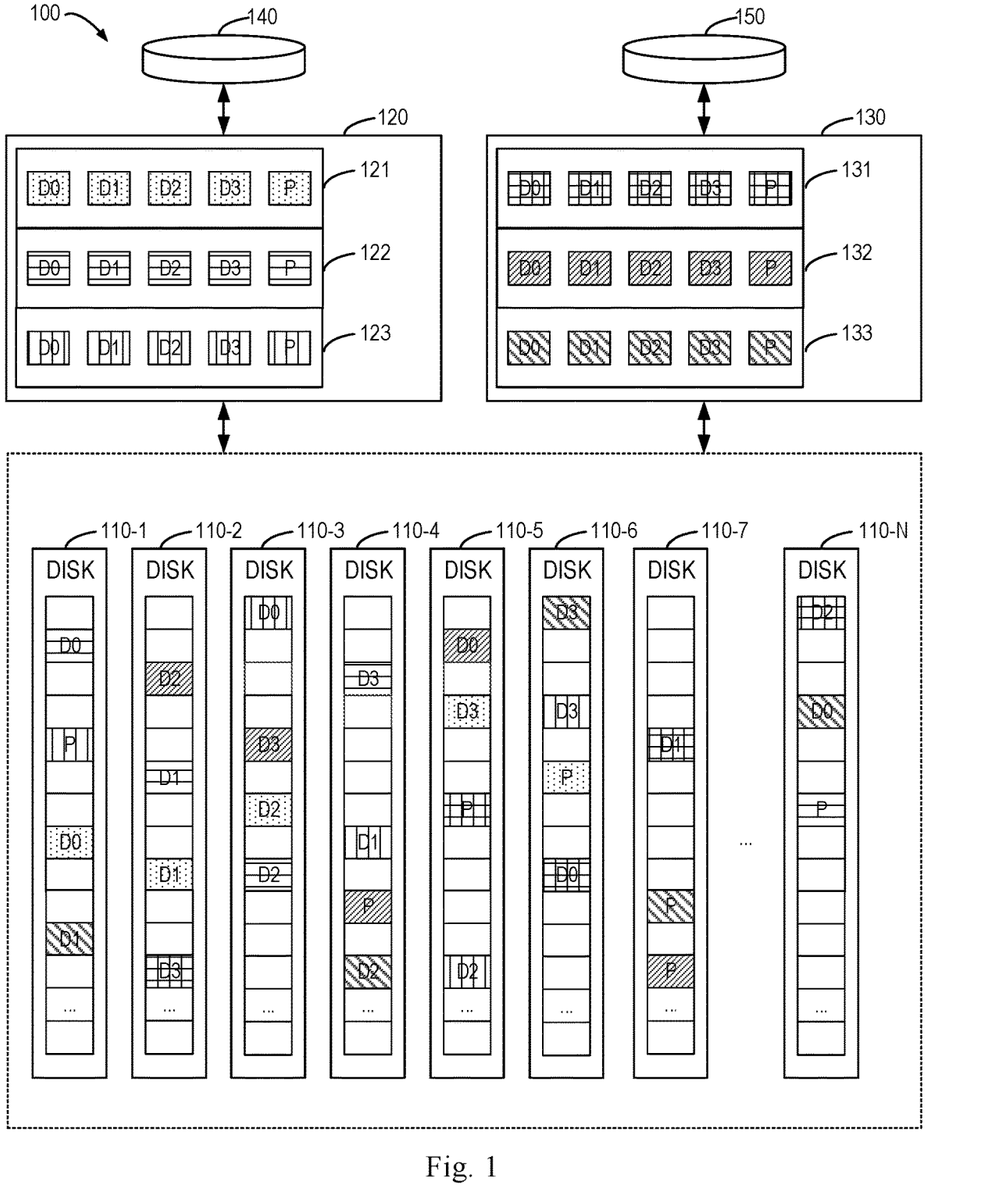
FIG. 1 illustrates a schematic diagram of an example storage resource pool.

FIG. 1 illustrates a schematic diagram of an example storage resource pool 100, which shows an example of a RAID 5 in a 4D+1P layout built on N storage disks 110-1~110-N (where N is greater than 5). As shown in FIG. 1, D0-D3 respectively represent data extents for storing user data, and P represents a parity extent for storing parity information. To create a RAID strip (including D0-D3 and P), five extents may be randomly selected from five different disks. Hence, the user data and parity information are evenly distributed in all disks. For example, in FIG. 1, an RAID group 120 and an RAID group 130 are created in the storage resource pool 100. The RAID group 120 may include RAID strips 121, 122 and 123, while the RAID group 130 may include RAID strips 131, 132 and 133. In addition, a logic storage unit 140 is created on the RAID group 120, and a logic storage unit 150 is created on the RAID group 130, for use by a user (e.g., an upper-layer application).

When the user requests to extend the capacity of the storage resource pool by adding a new disk, the newly-added disk may be divided into a plurality of extents, and these extents may be used to create a new RAID group. To ensure the access performance of the mapped RAID after the extension, it is usually necessary to perform a shuffling process to migrate data in some extents of the current disk to the extents of the newly-added disk, so as to ensure that the plurality of extents in the RAID strip of the extended mapped RAID are evenly distributed in the respective disks.

Figure 2A:
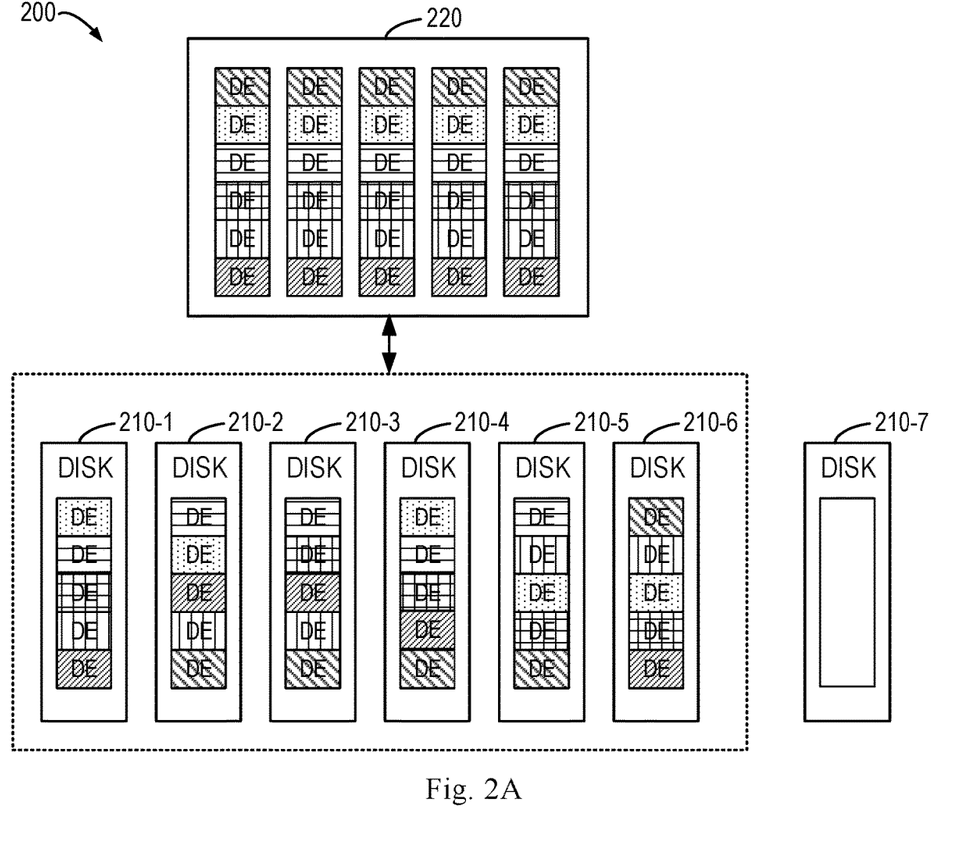
FIGS. 2A-2D illustrate schematic diagrams of a process for shuffling extents of the storage resource pool.
Figure 2B:
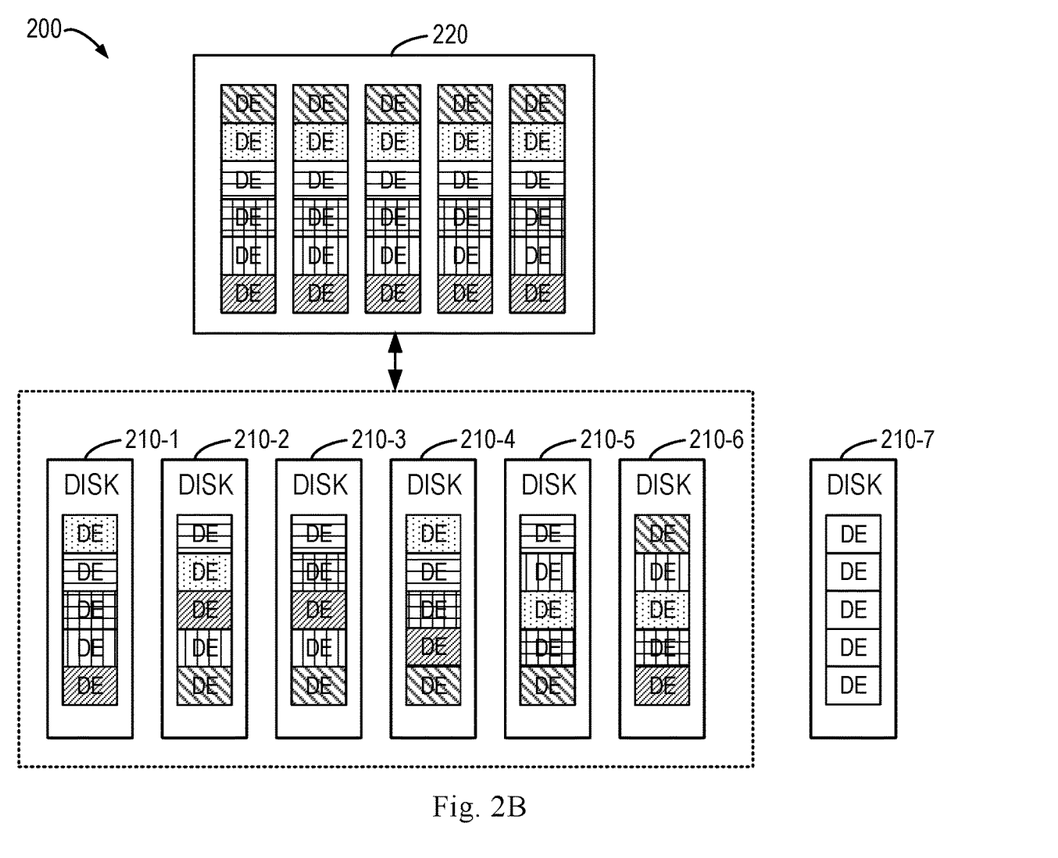
Figure 2C:
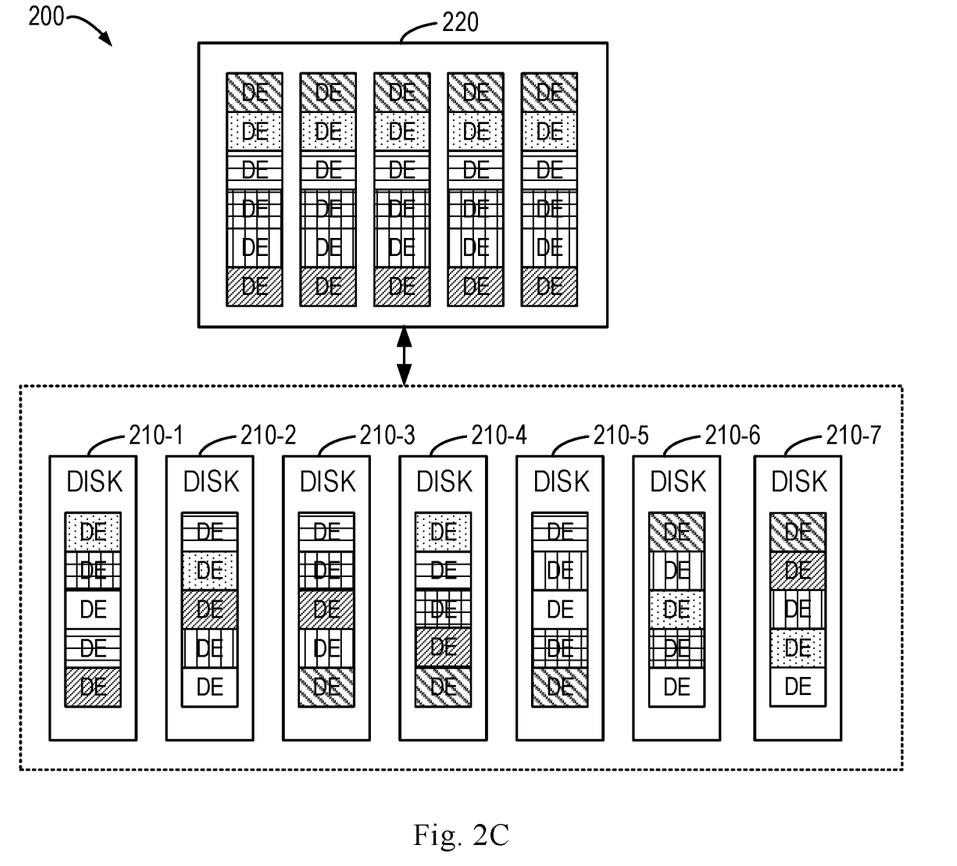
Figure 2D:
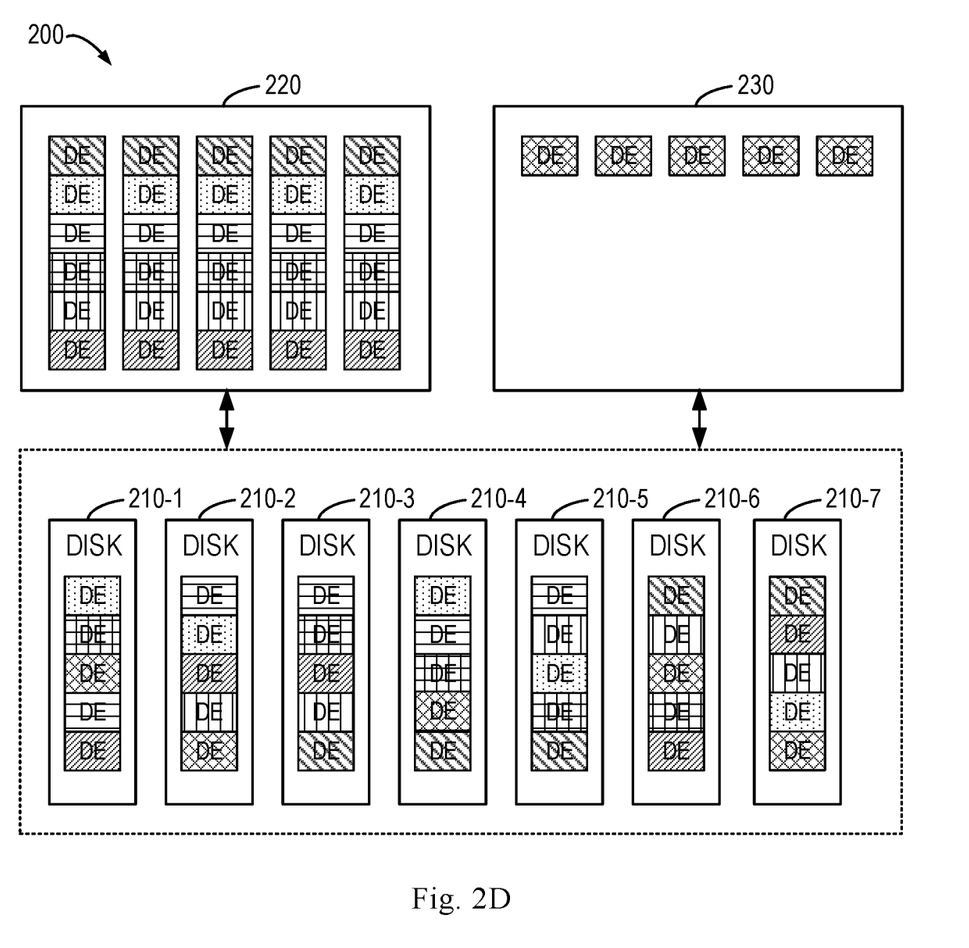

FIGS. 2A-2D illustrate schematic diagrams of the shuffling process. As shown in FIG. 2A, the storage resource pool 200 initially includes six disks 210-1-210-6, and an RAID group 220 is built thereon. For example, the user desires to add a disk 210-7 to the storage resource pool 200. As shown in FIG. 2B, the newly-added disk 210-7 is divided into a plurality of extents (DEs). In FIG. 2C, data in some extents of the original six disks 210-1-210-6 are migrated to the extents of the newly-added disk 210-7. In FIG. 2D, after data migration as shown in FIG. 2C is completed, a new RAID group 230 may be created based on the current seven disks 210-1-210-7 of the storage resource pool 200. As shown in FIG. 2D, the new RAID group 230 only includes one RAID strip, in which five extents come from disks 210-1, 210-2, 210-4, 210-6 and 210-7 respectively.

It can be seen from FIG. 2 that before obtaining the newly-created RAID group 230, the user needs to wait for completion of the shuffling process. If the amount of data to be migrated is relatively large, the user usually needs to wait a very long period of time to obtain an available capacity of the extended storage resource pool. For example, in the example as shown in FIGS. 2A-2D, assuming that the number of disks to be added is more than one disk (e.g., the number of the disks are not sufficient to create a new storage resource pool), the user might need to wait for a long period of time to obtain an available logic storage unit created on the newly-created RAID group.

Embodiments of the present disclosure provide a solution for managing a storage system, aiming to solve the above problems or one or more of other potential problems. The solution enables a multi-phase extension with respect to the storage resource pool. When the newly-added disks are not sufficient to create a new storage resource pool, the solution permits to firstly add a portion (e.g., only one) of the disks to the storage resource pool, and then add remaining disks to the storage resource pool. As such, at least a portion of the newly-added capacity of the extended storage resource pool will be available to the user as quickly as possible. In addition, the solution permits the user to decide a respective number of disks to be added in each of the multiple phases, so that the user can balance between the time to obtain the newly-added capacity and the available size of the newly-added capacity to be obtained.

Figure 3:
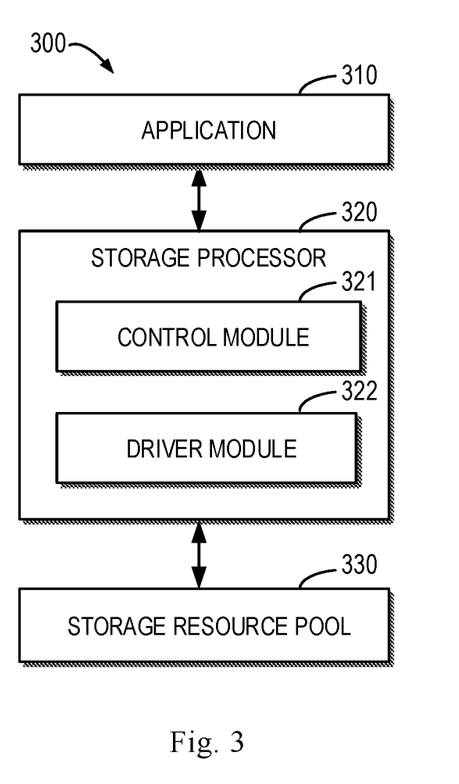
FIG. 3 illustrates a block diagram of an example storage system in which embodiments of the present disclosure can be implemented.

FIG. 3 illustrates a block diagram of an example storage system 300 in which an embodiment of the present disclosure can be implemented. As shown in FIG. 3, the storage system 300 includes an application 310, a storage processor (SP) 320 and a storage resource pool 330. It is to be understood that the structure and function of the storage system 300 are described only for the purpose of illustration, without suggesting any limitations to the scope of the present disclosure. As described below in more details, embodiments of the present disclosure may be applied to another storage system having a different structure and/or different functions.

An example of the storage resource pool 330 may be the storage resource pool 100 as shown in FIG. 1 or the storage resource pool 200 as shown in FIGS. 2A-2D. The storage resource pool 330 may include a plurality of disks. As used herein, a "disk" may refer to any non-volatile storage medium currently known or to be developed in future, for example, a magnetic disk, an optical disk or a solid-state disk (SSD). For example, each disk in the storage resource pool 330 may be divided into a set of continuous, non-overlapping and fixed sized disk extents. The plurality of extents of the plurality of disks may be organized into one or more RAID groups. A logic storage unit can be created based on the RAID group for use by the application 310.

The application 310 may run on any physical computer, virtual machine, server and so on. The application 310 may send a request to the storage processor 310 to operate the storage resource pool 330. The storage processor 320 may be configured to manage the storage resource pool 330.

As shown in FIG. 3, the storage processor 320 for example may include a control module 321 and a driver module 322. The control module 321 may receive from the application 310 a request, for example, to extend or shrink the storage resource pool 330. The control module 321 may generate a corresponding command based on the request received from the application 310, and send the command to the driver module 322.

The driver module 322 may perform a corresponding operation in response to the command from the control module 321. For example, such operation may include but not limited to creating various storage objects (e.g., RAID groups or logic storage units) in the storage resource pool, and performing the shuffling operation shown in FIG. 2 on the storage resource pool.

Figure 4:
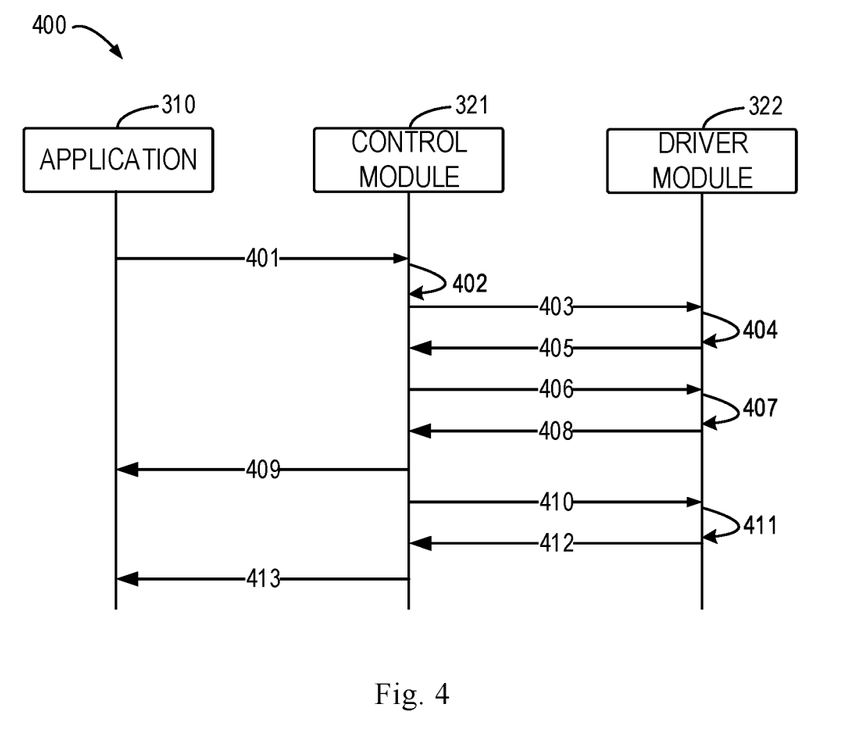
FIG. 4 illustrates a flow chart of an example process for managing a storage system according to embodiments of the present disclosure.

FIG. 4 illustrates a flow chart of an example process 400 for managing a storage system according to embodiments of the present disclosure. For the purpose of illustration, the process 400 is described in FIG. 4 with respect to the application 310, control module 321 and driver module 322 as shown in FIG. 3. It is to be understood that the method 400 may further include additional acts not shown and/or omit some shown acts. The scope of the present disclosure is not limited in this aspect.

As shown in FIG. 4, the application 310 may send 401, to the control module 321, a request to extend the storage resource pool 330. In some embodiments, the request for example may indicate a first number of disks are to be added to the storage resource pool 330.

In response to receiving the request, the control module 321 may determine 402 whether the first number of disks are to be added to the storage resource pool 330 in a plurality of phases.

In some embodiments, the control module 321 may determine, based on the first number, determine whether to add the first number of disks to the storage resource pool 330 via multiple phases. For example, if the first number is below a predetermined threshold, the control module 321 may determine that the first number of disks are to be added to the storage resource pool 330 in a plurality of phases. When the first number exceeds the predetermined threshold, the control module 321 may that the first number of disks are to be added to the storage resource pool 330 in only one phase.

In some embodiments, the predetermined threshold may be associated with a width of the RAID. Taking a RAIDS with 4D+P1 layout as an example, its width is the number of extents included in one RAID strip, namely, five. In some embodiments, the predetermined threshold may be any value greater than the RAID width. For example, the predetermined threshold may be the RAID width plus 1, namely, 6. Additionally or alternatively, the predetermined threshold may refer to a minimum number of disks required for creating a new storage resource pool. As will be further described below, in some embodiments, if the first number of the disks to be added exceeds the predetermined threshold, for example the control module 321 may control the driver module 322 to directly create a new storage resource pool based on the first number of disks, and then create an RAID group and a logic storage unit on the new storage resource pool for use by the application 310. That is, when the first number of the disks to be added exceeds the predetermined threshold, the shuffling process shown in FIG. 2 may not need to be performed.

In some embodiments, at 402, in response to determining that the first number of disks are to be added to the storage resource pool 330 in one or more phases, the control module 321 may further determine a respective number of disks to be added to the storage resource pool 330 in each of the one or more phases.

In some embodiments, regarding a multi-phase extension, the corresponding number of disks to be added to the storage resource pool 330 in each of the one or more phases may be specified by the application 310 (e.g., the user). Alternatively, in other embodiments, the corresponding number of disks to be added to the storage resource pool 330 in each of the multiple phases may be a predetermined value. For example, taking a two-phase extension as an example, only one disk may be added to the storage resource pool 330 in a first phase, and one or more remaining disks may be added to the storage resource pool 330 in a subsequent second phase.

The control module 321 may send 403 a first command to the driver module 322, to obtain from the driver module 322 information on one or more RAID groups to be created in the storage resource pool 330 in each of the one or more phases.

In some embodiments, for example, the first command may include: an indication about whether to perform the extension in multiple phase, a corresponding number of disks to be added to the storage resource pool 330 in each of the multiple phases, and other information about the storage resource pool 330 (e.g., the number of disks, the size of an extent, a RAID type, and a RAID width).

In response to receiving the first command from the control module 321, the driver module 322 may determine, based on the first command, information on the one or more RAID groups to be created in the storage resource pool 330 in each of the multiple phases.

Figure 5:
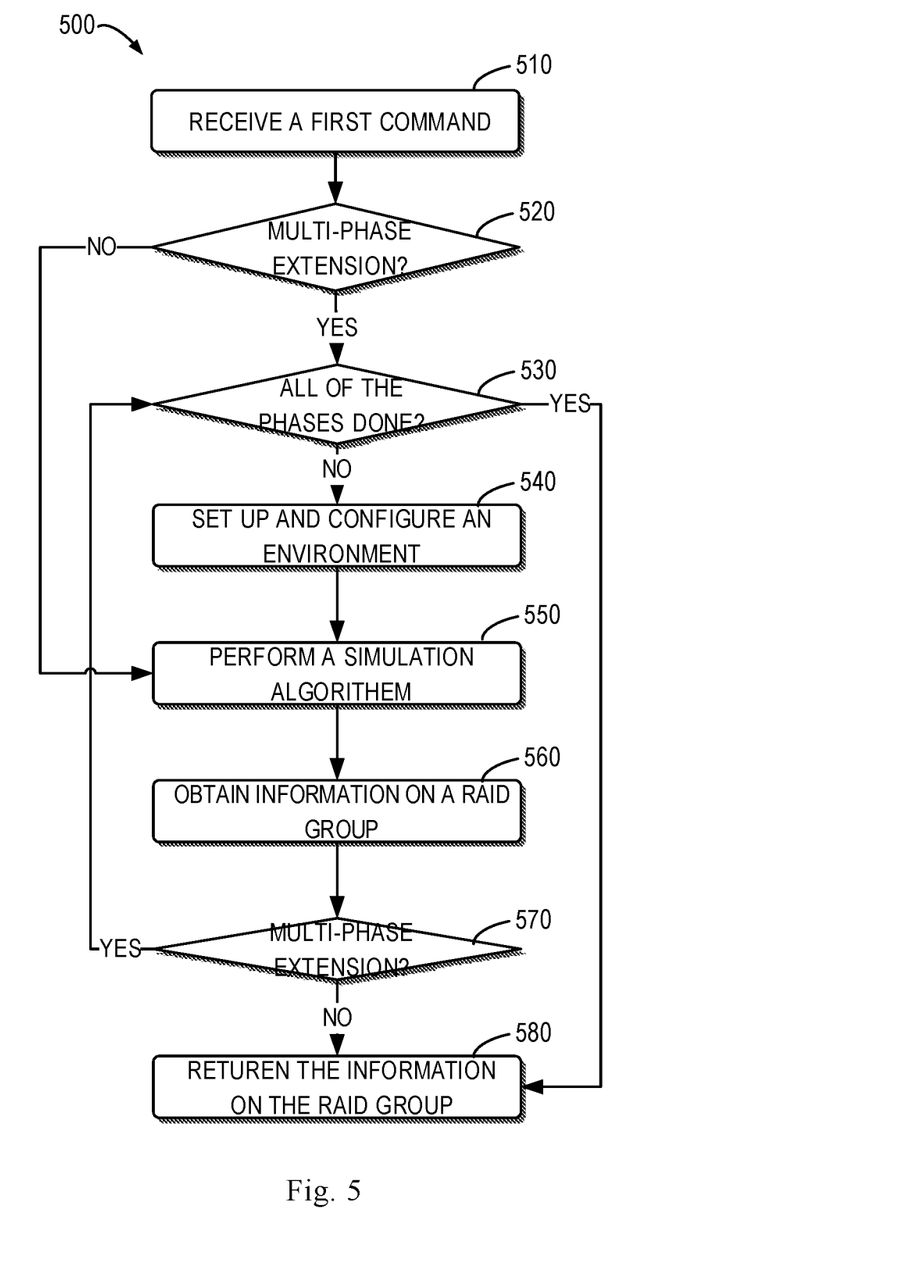
FIG. 5 illustrates a flow chart of an example process for determining information on a RAID group to be created according to embodiments of the present disclosure.

FIG. 5 illustrates a flow chart of an example process 500 executed at the driver module 322 according to embodiments of the present disclosure. For example, the process 500 may serve as an example implementation of the act 404 as shown in FIG. 4. It is to be understood that the process 500 may further include additional acts not shown and/or omit some shown acts. The scope of the present disclosure is not limited in this aspect.

At 510, the driver module 323 receives the first command from the control module 321. As stated above, for example, the first command may include: an indication about whether to perform extension in multiple phase, a corresponding number of disks to be added to the storage resource pool 330 in each of the multiple phases, and other information about the storage resource pool 330 (e.g., the number of disks, the size of an extent, a RAID type, and a RAID width).

At 520, the driver module 322 determines, based on the first command, whether the extension of the storage resource pool 330 is a multi-phase extension. For example, the driver module 322 may perform the determination based on the indication about whether to perform the extension in multiple phases which is included in the first command.

If the driver module 322 determines that the extension for the storage resource pool 330 is a multi-phase extension, at 530, the driver module 322 determines whether all of the multiple phases have been performed.

If there is a phase that has not been processed yet, at 540, the driver module 322 may set up a simulation environment, and configure the simulation environment with information of the storage resource pool 330 prior to the extension in this phase.

Then, at 550, the driver module 322 may perform a predetermined simulation algorithm based on the number of disks to be added in this phase (for example, the algorithm may include the shuffling process as shown in FIG. 2), and at 560, obtain information on a RAID group to be created in this phase.

If the driver module 322 determines that the extension for the storage resource pool 330 is a single-phase extension (e.g., when the first number of the disks to be added are sufficient to create a new storage resource pool), the process 500 may proceed to 550, where the driver module 322 may perform the predetermined simulation algorithm based on the first number of disks to be added, so as to obtain, at 560, the information on the RAID group to be created.

Then, the process 500 proceeds to 570, where the driver module 322 may determine whether the extension of the storage resource pool 330 is a multi-phase extension (identical to the act 520). If the extension is a single-phase extension, at 580, the driver module 322 returns the obtained information on the RAID group to be created. If the extension is a multi-phase extension, the process 500 proceeds to 530.

If the driver module 322 determines that all of the multiple phases are already performed at 530, the process 500 proceeds to 580, where the driver module 322 returns the obtained information on respective RAID groups to be created in the multiple phases.

Returning to FIG. 2, in response to determining the information on one or more RAID groups to be created in the storage resource pool 330 in each of the one or more phases, the driver module 322 may return 405 the information to the control module 321. In some embodiments, the returned information for example may include: a respective number of RAID groups to be created in each of the multiple phases, a total RAID capacity that can be provided in each of the multiple phases, a capacity of each of the RAID groups, and the number of disk extents to be shuffled estimated prior to the RAID group being created.

The control module 321 may generate one or more corresponding commands based on the obtained information, so as to control the driver module 322 to perform specific operations. For example, such operations may include but not limited to creating various storage objects (e.g., RAID group or logic storage unit) in the storage resource pool, and performing the shuffling operation as shown in FIG. 2 for the storage resource pool. In the following, it is assumed that the storage resource pool 330 is to be extended in two phases.

As shown in FIG. 4, the control module 321 may send 406, to the driver module 322, a first sequence of commands for the extension in a first phase. For example, the first sequence of commands may include respective commands for initiating a storage resource pool extension task in the first phase, creating a corresponding RAID group, creating a logic storage unit, and adding and activating the created logic storage unit. In response to receiving the first sequence of commands, the driver module 322 may perform 407 respective operations to create a corresponding RAID group (also called "a first disk array group" herein) with the disks to be added in the first phase (also called "a second number of disks" herein), and further create, add and/or activate a logical storage unit on the created RAID group. The driver module 322 may return 408 an execution result of the first phase to the control module 321. In response to receiving the execution result, the control module 321 may indicate 409, to the application 310, a newly-added available capacity of the extended storage resource pool 330 for use by the application 310.

The control module 321 may further send 410, to the driver module 322, a second sequence of commands for the extension in a second phase. For example, the second sequence of commands may include respective commands for initiating a storage resource pool extension task in the second phase, creating a corresponding RAID group, creating a logic storage unit, and adding and activating the created logic storage unit. In response to receiving the second sequence of commands, the driver module 322 may perform 411 respective operations to create a corresponding RAID group (also called "a second disk array group" herein) with the disks to be added in the second phase (also called "a third number of disks" herein), and further create, add and/or activate a logical storage unit on the created RAID group. The driver module 322 may return 408 an execution result of the second phase to the control module 321. In response to receiving the execution result, the control module 321 may indicate 413, to the application 310, a newly-added available capacity of the extended storage resource pool 330 for use by the application 310.

In the example as shown in FIG. 4, if the number of disks to be added to the storage resource pool 330 is below the predetermined threshold, the control module 321 may perform the extension of the storage resource pool 330 in two phases. For example, only a part of the disks (e.g., only one) may be added to the storage resource pool 330 in a first phase, and then other disks may be added to the storage resource pool 330 in a second phase. If any operation in the first phase fails, all of the extension operations that have been performed may be rolled back, so as to restore the storage resource pool 330 back to a state before the first phase extension. If all operations in the first phase succeed but a certain operation in the second phase fails, all of the extension operations that have been performed in the second phase may be rolled back, so as to restore the storage resource pool 330 back to a state when the first phase extension is completed. This is because the control module 321 may have already activated the created logic storage object and provided it to the application 310 for use at the end of the first phase. In this case, it is unnecessary to roll back any operation performed in the first phase. Hence, such rollback mechanism can greatly reduce the overall time of the failure rollback process.

Figure 6:
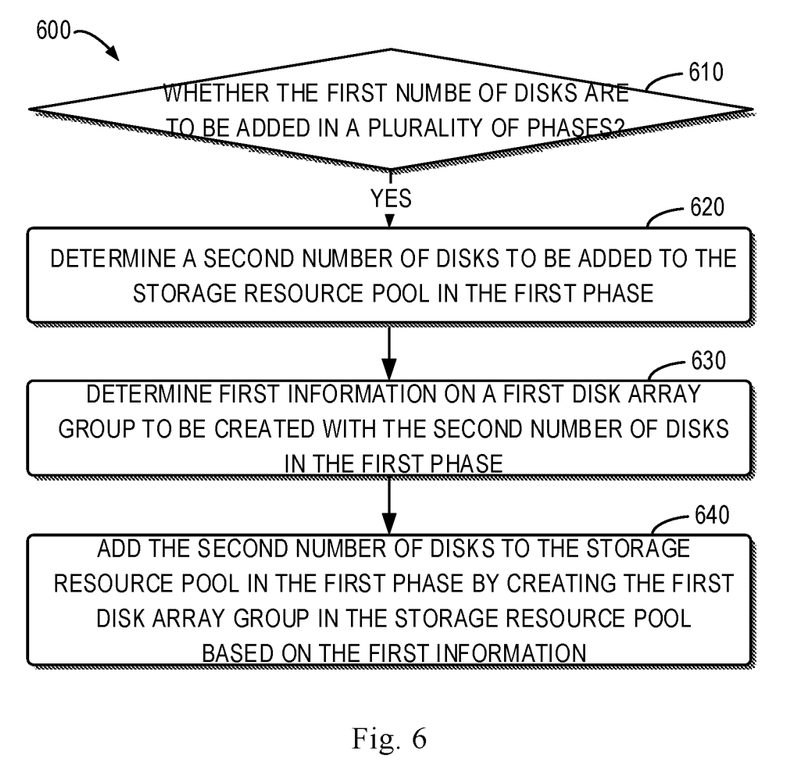
FIG. 6 illustrates a flow chart of an example method for managing a storage system according to embodiments of the present disclosure.

FIG. 6 illustrates a flow chart of an example method 600 for managing a storage system according to embodiments of the present disclosure. For example, the method 600 may be executed by the storage processor 320 as shown in FIG. 1. It is to be understood that the method 600 may further include additional acts not shown and/or omit some shown acts. The scope of the present disclosure is not limited in this aspect.

At 610, in response to receiving a request to add the first number of disks to a storage resource pool in a storage system, the storage processor 320 determines whether the first number of disks are to be added to the storage resource pool in a plurality of phases, wherein the storage resource pool includes at least one disk having a plurality of extents, and at least a part of the plurality of extents is included in at least one disk array group.

In some embodiments, the storage processor 320 may determine, based on the first number, whether to add the first number of disks to the storage resource pool in the plurality of phases.

In some embodiments, the storage processor 320 may determine that the first number of disks are to be added to the storage resource pool in the plurality of phases in response to the first number being below a predetermined threshold.

In some embodiments, the at least one disk array group is a redundant array of independent disks (RAID), and the predetermined threshold is associated with a width of the RAID.

In some embodiments, the predetermined threshold indicates a minimum number of disks required for creating a storage resource pool.

In some embodiments, the storage processor 320 may create another storage resource pool in the storage system using the first number of disks in response to the first number exceeding the predetermined threshold.

At 620, in response to determining that the first number of disks are to be added to the storage resource pool in the plurality of phases including a first phase, the storage processor 320 determines a second number of disks to be added to the storage resource pool in the first phase.

At 630, the storage processor 320 determines first information on a first disk array group to be created with the second number of disks in the first phase.

At 640, the storage processor 320 adds the second number of disks to the storage resource pool in the first phase by creating the first disk array group in the storage resource pool based on the first information.

In some embodiments, the plurality of phases further include a second phase. The storage processor 320 may determine a third number of disks to be added to the storage resource pool in the second phase. The storage processor 320 may determine, based on the third number, second information on a second disk array group to be created in the storage resource pool in the second phase. In response to the second number of disks being added to the storage resource pool, the storage processor 320 may add the third number of disks to the storage resource pool in the second phase by creating the second disk array group in the storage resource pool based on the second information.

In some embodiments, the third number exceeds the second number. In some embodiments, the second number is one.

As can be seen from the above depictions, the solution for managing a storage system according to embodiments of the present disclosure enables a multi-phase extension with respect to the storage resource pool. When the newly-added disks are not sufficient to create a new storage resource pool, the solution permits to firstly add a portion (e.g., only one) of the disks to the storage resource pool, and then add remaining disks to the storage resource pool. As such, at least a portion of the newly-added capacity of the extended storage resource pool will be available to the user as quickly as possible. In addition, the solution permits the user to decide a respective number of disks to be added in each of the multiple phases, so that the user can balance between the time to obtain the newly-added capacity and the available size of the newly-added capacity to be obtained.

It should be understood that one or more of the above-described acts of the method 600 may be performed by the storage system while the storage system responds to host input/output (I/O) requests on behalf of one or more host computers. In some arrangements, all of the acts of the method 600 occur while processing circuitry of the storage system performs data storage operations on the RAID in response to host I/O requests from a set of host computers.

Figure 7:
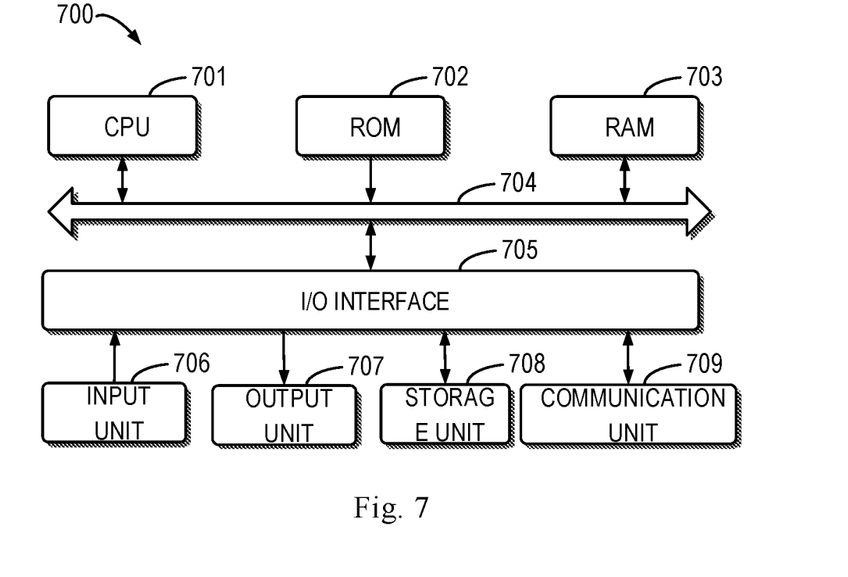
FIG. 7 illustrates a block diagram of an example device adapted to implement embodiments of the present disclosure.

FIG. 7 illustrates a block diagram of an example device 700 adapted to implement embodiments of the present disclosure. For example, the storage processor 320 as shown in FIG. 3 may be implemented by the device 700. As shown, the device 700 includes a central process unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operation of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 706, such as keyboard, mouse and the like; an output unit 707, e.g., various kinds of display and loudspeakers etc.; a storage unit 708, such as disk and optical disk etc.; and a communication unit 709, such as network card, modem, wireless transceiver and the like. The communication unit 709 allows the device 700 to exchange information/data with other devices via the computer network, such as Internet, and/or various telecommunication networks.

The above described each procedure and processing, such as the method 500 and/or 600, can also be executed by the processing unit 701. For example, in some embodiments, the method 500 and/or 600 can be implemented as a computer software program tangibly included in the machine-readable medium, e.g., storage unit 708. In some embodiments, the computer program can be partially or fully loaded and/or mounted to the device 700 via ROM 702 and/or communication unit 709. When the computer program is loaded to RAM 703 and executed by the CPU 701, one or more actions of the above described method 500 and/or 600 can be implemented.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (device) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processor of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is by way of example rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable those ordinary skilled in the art to understand embodiments of the present disclosure.

We claim:

1. A method for managing a storage system, comprising:
in response to receiving a request to add a first number of disks to a storage resource pool in the storage system, determining whether the first number of disks are to be added to the storage resource pool in a plurality of phases, the storage resource pool including at least one disk having a plurality of extents, at least a part of the plurality of extents being included in at least one disk array group;
in response to determining that the first number of disks are to be added to the storage resource pool in the plurality of phases including a first phase, determining a second number of disks to be added to the storage resource pool in the first phase, the second number of disks being a portion of the first number of disks;
determining first information on a first disk array group to be created with the portion of the first number of disks in the first phase, the determining of the first information including at least obtaining an estimated number of extents to be shuffled prior to creating the first disk array group;
adding the portion of the first number of disks to the storage resource pool in the first phase to extend the storage resource pool;
shuffling the obtained estimated number of extents among the at least one disk included in the storage resource pool and the portion of the first number of disks added to the storage resource pool to allow quicker availability of the extended storage resource pool; and
creating the first disk array group in the storage resource pool based on the first information.

2. The method according to claim 1, wherein the determining whether the first number of disks are to be added to the storage resource pool in a plurality of phases comprises:
determining, based on the first number, whether to add the first number of disks to the storage resource pool in the plurality of phases.

3. The method according to claim 2, wherein the determining whether the first number of disks are to be added to the storage resource pool in a plurality of phases comprises:
in response to the first number being below a predetermined threshold, determining that the first number of disks are to be added to the storage resource pool in the plurality of phases.

4. The method according to claim 3, wherein the at least one disk array group is a redundant array of independent disks (RAID), and the predetermined threshold is associated with a width of the RAID.

5. The method according to claim 3, wherein the predetermined threshold indicates a minimum number of disks required for creating a storage resource pool.

6. The method according to claim 5, further comprising:
in response to the first number exceeding the predetermined threshold, create another storage resource pool in the storage system using the first number of disks.

7. The method according to claim 1, wherein the plurality of phases further include a second phase, and the method further comprises:
determining a third number of disks to be added to the storage resource pool in the second phase;
determining, based on the third number, second information on a second disk array group to be created in the storage resource pool in the second phase; and
in response to the second number of disks being added to the storage resource pool, adding the third number of disks to the storage resource pool in the second phase by creating the second disk array group in the storage resource pool based on the second information.

8. The method according to claim 7, wherein the third number exceeds the second number.

9. The method according to claim 8, wherein the second number is one.

10. An apparatus for managing a storage system, comprising:
at least one processing unit;
at least one memory coupled to the at least one processing unit and storing instructions for execution by the at least one processing unit, the instructions, when executed by the at least one processing unit, causing the apparatus to perform acts comprising:
in response to receiving a request to add a first number of disks to a storage resource pool in the storage system, determining whether the first number of disks are to be added to the storage resource pool in a plurality of phases, the storage resource pool including at least one disk having a plurality of extents, at least a part of the plurality of extents being included in at least one disk array group;
in response to determining that the first number of disks are to be added to the storage resource pool in the plurality of phases including a first phase, determining a second number of disks to be added to the storage resource pool in the first phase, the second number of disks being a portion of the first number of disks;
determining first information on a first disk array group to be created with the portion of the first number of disks in the first phase, the determining of the first information including at least obtaining an estimated number of extents to be shuffled prior to creating the first disk array group;
adding the portion of the first number of disks to the storage resource pool in the first phase to extend the storage resource pool;
shuffling the obtained estimated number of extents among the at least one disk included in the storage resource pool and the portion of the first number of disks added to the storage resource pool to allow quicker availability of the extended storage resource pool; and
creating the first disk array group in the storage resource pool based on the first information.

11. The apparatus according to claim 10, wherein the determining whether the first number of disks are to be added to the storage resource pool in a plurality of phases comprises:
determining, based on the first number, whether to add the first number of disks to the storage resource pool in the plurality of phases.

12. The apparatus according to claim 11, wherein the determining whether the first number of disks are to be added to the storage resource pool in a plurality of phases comprises:
in response to the first number being below a predetermined threshold, determining that the first number of disks are to be added to the storage resource pool in the plurality of phases.

13. The apparatus according to claim 12, wherein the at least one disk array group is a redundant array of independent disks (RAID), and the predetermined threshold is associated with a width of the RAID.

14. The apparatus according to claim 12, wherein the predetermined threshold indicates a minimum number of disks required for creating a storage resource pool.

15. The apparatus according to claim 14, wherein the acts further comprise:
in response to the first number exceeding the predetermined threshold, create another storage resource pool in the storage system using the first number of disks.

16. The apparatus according to claim 10, wherein the plurality of phases further include a second phase, and the method further comprises:
determining a third number of disks to be added to the storage resource pool in the second phase;
determining, based on the third number, second information on a second disk array group to be created in the storage resource pool in the second phase; and
in response to the second number of disks being added to the storage resource pool, adding the third number of disks to the storage resource pool in the second phase by creating the second disk array group in the storage resource pool based on the second information.

17. The apparatus according to claim 16, wherein the third number exceeds the second number.

18. The apparatus according to claim 17, wherein the second number is one.

19. A computer program product having a non-transitory computer readable medium which stores a set of instructions to manage a storage system; the set of instructions, when carried out by computerized circuitry, causing the computerized circuitry to perform a method of:
in response to receiving a request to add a first number of disks to a storage resource pool in the storage system, determining whether the first number of disks are to be added to the storage resource pool in a plurality of phases, the storage resource pool including at least one disk having a plurality of extents, at least a part of the plurality of extents being included in at least one disk array group;
in response to determining that the first number of disks are to be added to the storage resource pool in the plurality of phases including a first phase, determining a second number of disks to be added to the storage resource pool in the first phase, the second number of disks being a portion of the first number of disks;
determining first information on a first disk array group to be created with the portion of the first number of disks in the first phase, the determining of the first information including at least obtaining an estimated number of extents to be shuffled prior to creating the first disk array group;
adding the portion of the first number of disks to the storage resource pool in the first phase to extend the storage resource pool;
shuffling the obtained estimated number of extents among the at least one disk included in the storage resource pool and the portion of the first number of disks added to the storage resource pool to allow quicker availability of the extended storage resource pool; and
creating the first disk array group in the storage resource pool based on the first information.

20. The computer program product according to claim 19, wherein determining whether the first number of disks are to be added to the storage resource pool in the plurality of phases, determining the second number of disks, determining the first information, and adding occur while the storage system performs data storage operations in response to host input/output (I/O) requests from a set of host computers.

* * * * *